(12) United States Patent
Stahl et al.

(10) Patent No.: US 7,917,902 B2
(45) Date of Patent: Mar. 29, 2011

(54) ARCHIVE STREAM BASED INSTALL

(75) Inventors: George Stahl, Santa Monica, CA (US); Collin Davis, Los Angeles, CA (US); Pieter Viljoen, Redondo Beach, CA (US); Brian Powell, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 434 days.

(21) Appl. No.: 12/053,448

(22) Filed: Mar. 21, 2008

(65) Prior Publication Data

US 2009/0240745 A1    Sep. 24, 2009

(51) Int. Cl.
*G06F 9/445* (2006.01)
(52) U.S. Cl. ......... 717/174; 707/667; 709/206; 709/229
(58) Field of Classification Search .................. 717/174; 707/667; 709/206, 229
See application file for complete search history.

(56) References Cited

U.S. PATENT DOCUMENTS

| 5,421,009 | A | * | 5/1995 | Platt ............................. 709/221 |
| 5,768,597 | A | * | 6/1998 | Simm .......................... 717/174 |
| 6,401,241 | B1 | * | 6/2002 | Taylor ......................... 717/174 |
| 6,711,594 | B2 | * | 3/2004 | Yano et al. ............... 707/999.01 |
| 7,735,057 | B2 | * | 6/2010 | Rachman et al. ............. 717/100 |
| 2002/0042833 | A1 | * | 4/2002 | Hendler et al. .............. 709/231 |
| 2002/0129107 | A1 | * | 9/2002 | Loughran et al. ............ 709/206 |
| 2002/0157089 | A1 |   | 10/2002 | Patel et al. |
| 2005/0138088 | A1 | * | 6/2005 | Basin et al. .................. 707/204 |
| 2008/0046371 | A1 | * | 2/2008 | He et al. ......................... 705/51 |
| 2009/0150881 | A1 | * | 6/2009 | Lupini et al. ................. 717/174 |

FOREIGN PATENT DOCUMENTS

| EP | 1 239 384 | 9/2002 |
| EP | 1 329 819 | 7/2003 |
| WO | WO-02/01350 | 1/2002 |

* cited by examiner

*Primary Examiner* — Cheyne D Ly
(74) *Attorney, Agent, or Firm* — Gunnison, McKay & Hodgson, L.L.P.; Forrest Gunnison

(57) ABSTRACT

Files to be installed on a computer system are streamed from an archive as the archive is being extracted directly to one or more final destination locations on the computer system.

14 Claims, 8 Drawing Sheets

ARCHIVE STREAM BASED INSTALL

BACKGROUND OF THE INVENTION

1. Field of the Invention

The present invention relates to the installation of software on computer systems. More particularly, the present invention relates to the installation of files from an archive to a computer system.

2. Description of Related Art

Many conventional software installation technologies, commonly termed install technologies, utilize a self extracting archive which implements a two-step process to install files onto a target computer system. In the first step, the files to be installed are extracted from the archive and copied to a predetermined systems temp folder. In the second step, an install process is launched, and the files in the systems temp folder are copied from the systems temp folder to final destination(s) on the target computer system. Typically a database, script, data file, or a combination of the foregoing is used to determine the order the files will be copied and where the files will be placed on the target computer system. This two-step process is a time and resource consuming process.

SUMMARY OF THE INVENTION

Embodiments in accordance with the invention, extract files from an archive directly to one or more final file destinations on a computer system. In one embodiment, the extraction process is hooked, which allows an archive specified file destination of the file to be changed to a final file destination location on the computer system. The file can then be written from the archive directly to the one or more final file destination locations on the computer system. In one embodiment, the hook is a call back hook implemented by a call back provided by the archive technology, i.e., 7-Zip, RAR, ZIP, CAB. In another embodiment, the hook is a file system hook that intercepts a file event associated with a file being opened by the extraction process.

In a further embodiment, an archive stream based installation extraction engine is configured to obtain the final file destination locations and to write the files directly from the archive to one or more final file destination locations on the computer system.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Embodiments in accordance with the invention directly stream files from an archive as the archive is being extracted to one or more final file destinations in a file system. Archive files are written once to their final file destination, rather than once to an interim temporary location, e.g., a systems temp folder, and then a second time to a final location, thereby reducing the installation time of the archive files.

In one embodiment, the archive determines the order of file extraction and the extraction of the archive drives the installation process. Processing files sequentially from the archive provides greater performance than does a random seek either on the file system or in the archive as the operating system will read ahead and buffer memory prior to the request.

Figure 1:
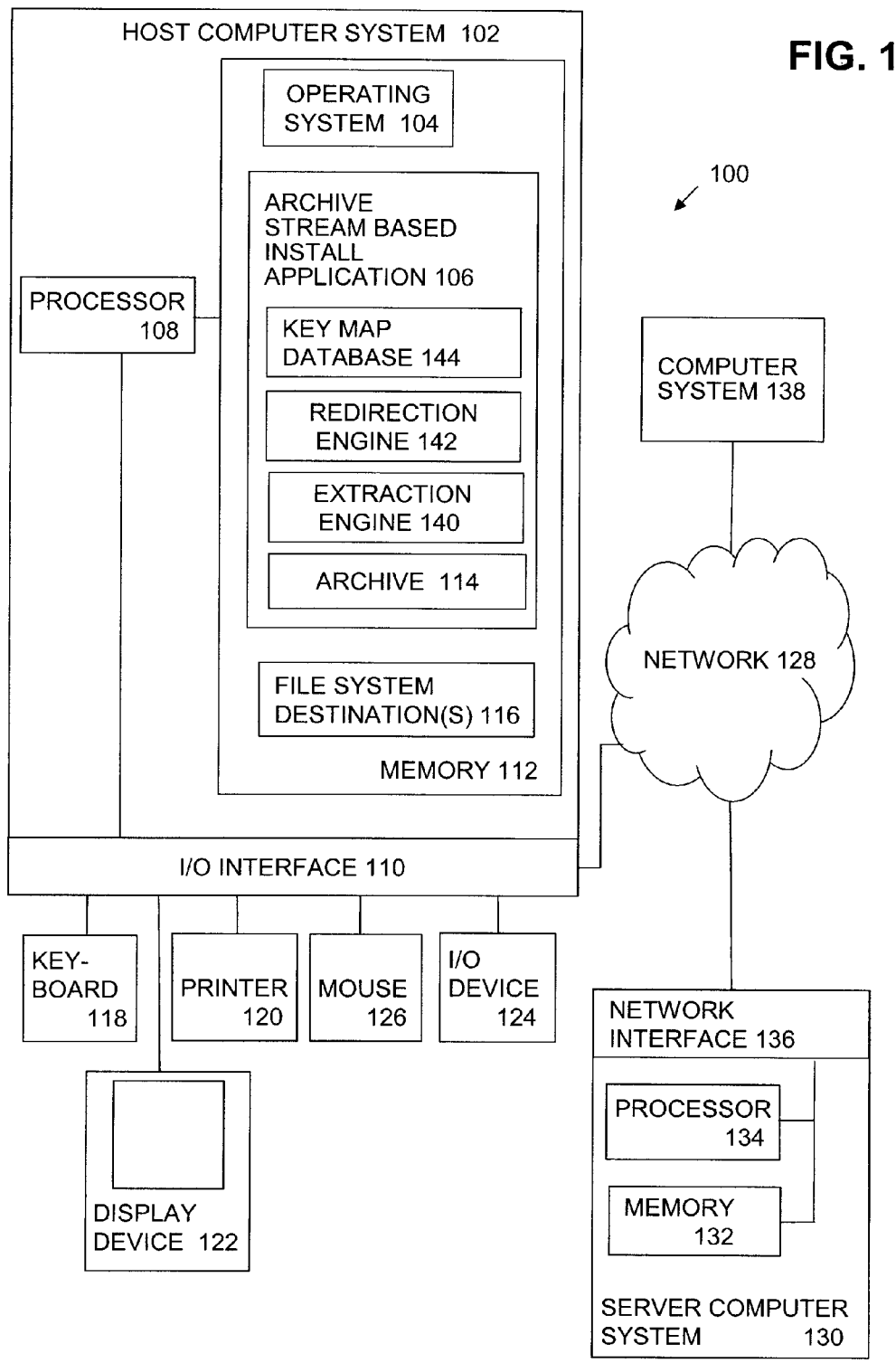
FIG. 1 is a diagram of a computer system including an archive stream based install application executing on a host computer system in accordance with one embodiment of the invention.

Referring more particularly to FIG. 1, FIG. 1 is a diagram of a computer system 100 including an archive stream based install application 106 executing on a host computer system 102, e.g., a first computer system, in accordance with one embodiment of the present invention. Host computer system 102, sometimes called a client or user device, typically includes a central processing unit (CPU) 108, hereinafter processor 108, an input/output (I/O) interface 110, a memory 112, and an operating system 104. In one embodiment, archive stream based install application 106 is stored in memory 112 of host computer system 102 and executed on host computer system 102.

In one embodiment, memory 112 includes storage media (not shown) for permanent storage of files, sometimes called non-volatile memory, non-temporary storage memory, non-temporary storage media, or permanent storage memory. For example, in one embodiment, the storage media is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of host computer system 102.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of host computer system 102. In one embodiment, host computer system 102 utilizes a file system (not shown) for managing the storage of files on host computer system 102.

Host computer system 102 may further include standard devices like a keyboard 118, a mouse 126, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, archive stream based install application 106 is loaded onto host computer system 102 via I/O device 124, such as from a CD, DVD or floppy disk containing archive stream based install application 106.

In one embodiment, archive stream based install application 106 includes: an archive 114; an extraction engine 140; a redirection engine 142; and, a key map database 144. In one embodiment, archive 114 includes one or more files and/or file folders to be installed on a target computer system, such as host computer system 102. In one embodiment, archive 114 is a keyed archive in which each of the folders to be extracted is identified by a key identifier.

In one embodiment, extraction engine 140 is an application, e.g., programming code, which reads files from archive 114 and writes the archive files to host computer system 102. In one embodiment, key map database 144 is a database of information including final destination information corresponding to files in archive 114. In one embodiment key map database 144 includes entries which include key identifiers and corresponding final destination paths, e.g., final destination locations.

In one embodiment, redirection engine 142 is an application, e.g., programming code, which manages the extraction of files from archive 114 by extraction engine 140 to final destinations on host computer system 102, such as file system location(s) 116, in accordance with the information in key map database 144. The various components of archive stream based install application 106 are further described herein in more detail with reference to FIGS. 2-6.

In one embodiment, host computer system 102 is coupled to a server computer system 130 of system 100 by a network 128. Server computer system 130 typically includes a processor 134, a memory 132, and a network interface 136.

Host computer system 102 can also be coupled to other computer systems of system 100, such as a computer system 138, by network 128. In one embodiment, computer system 138 is similar to host computer system 102 and, for example, includes a central processing unit, an input output (I/O) interface, and a memory. Computer system 138 may further include standard devices such as a keyboard, a mouse, a printer, a display device and an I/O device(s). The various hardware components of computer system 138 are not illustrated to avoid detracting from the principles of the invention.

Network 128 can be any network or network system that is of interest to a user. In various embodiments, network interface 136 and I/O interface 110 include analog modems, digital modems, or a network interface card. The particular type, and configuration, of host computer system 102, computer system 138, and server computer system 130 are not essential to the present invention.

Figure 2:
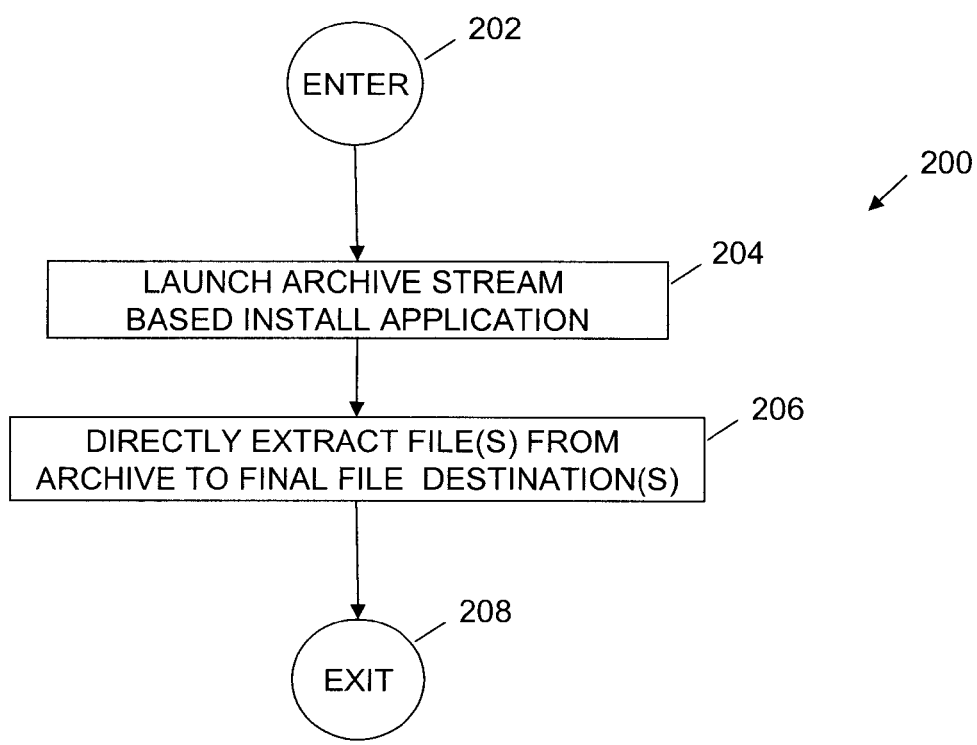
FIG. 2 is a high level flow diagram of a method for archive stream based installation of one or more software files in accordance with one embodiment of the invention.

FIG. 2 is a high level flow diagram of a method 200 for archive stream based installation of one or more software files in accordance with one embodiment of the invention. Referring now to FIGS. 1 and 2 together, in one embodiment, execution of archive stream based install application 106 by processor 108 results in the operations of method 200 as described below.

In the present embodiment, archive stream based install application 106 is installed on host computer system 102. In one embodiment, method 200 is entered at an ENTER operation 202, and from ENTER operation 202, processing transitions to a LAUNCH ARCHIVE STREAM BASED INSTALL APPLICATION operation 204.

In LAUNCH ARCHIVE STREAM BASED INSTALL APPLICATION operation 204, archive stream based install application 106 is launched on host computer system 102. From LAUNCH ARCHIVE STREAM BASED INSTALL APPLICATION operation 204, processing transitions to a DIRECTLY EXTRACT FILE(S) FROM ARCHIVE TO FINAL DESTINATION(S) operation 206.

In DIRECTLY EXTRACT FILE(S) FROM ARCHIVE TO FINAL DESTINATION(S) operation 206, the archive files to be installed on host computer system 102 are automatically extracted directly from the archive, e.g., archive 114, and written to one or more final destinations on host computer system 102, e.g., final file destination(s) 116. From DIRECTLY EXTRACT FILE(S) FROM ARCHIVE TO FINAL DESTINATION(S) operation 206, processing transitions to an EXIT operation 208 with processing exiting method 200. Various embodiments for directly extracting file(s) from the archive to final destinations on host computer system 102 are further described herein with reference to FIGS. 3, 4, 5, and 6.

Figure 3:
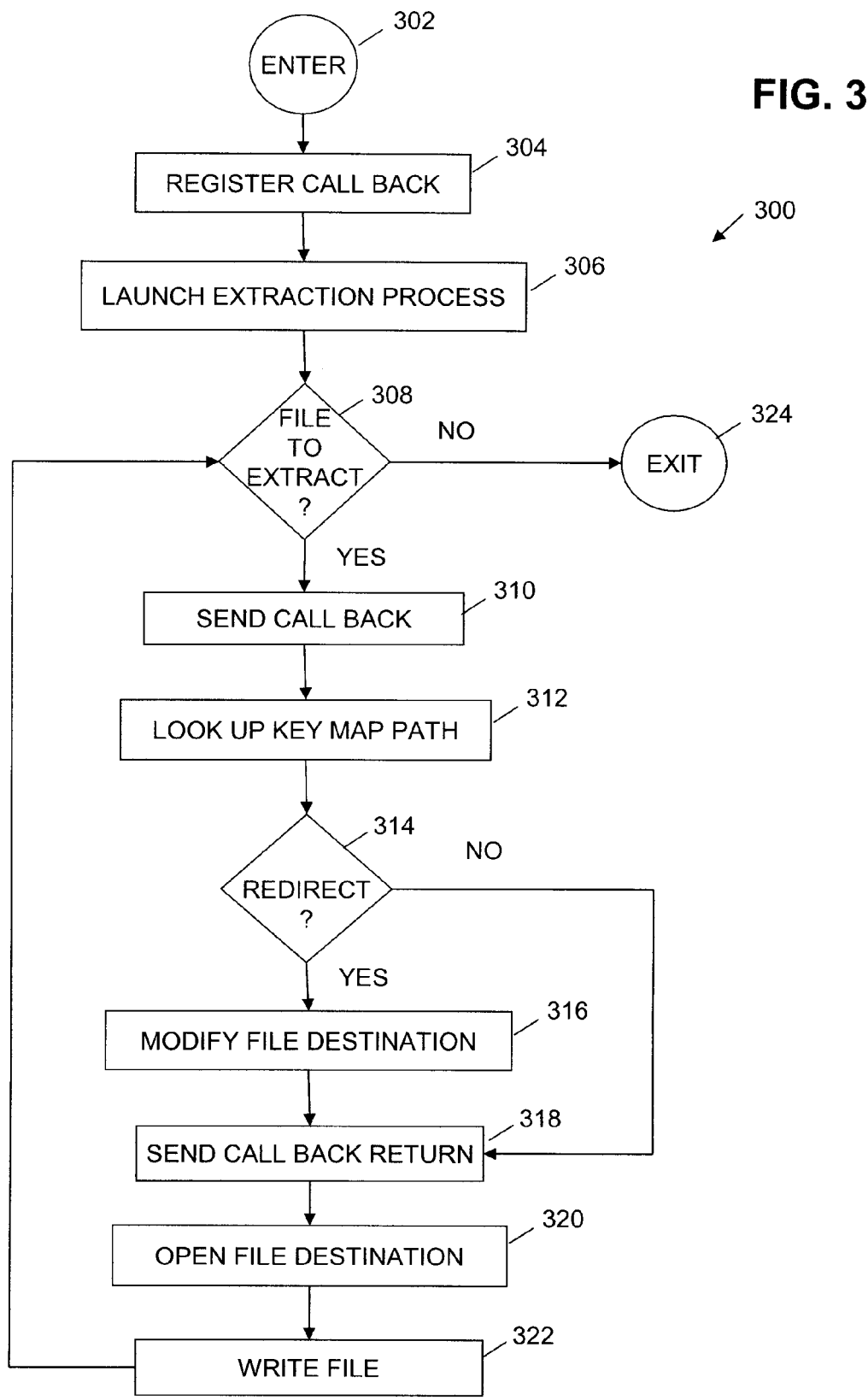
FIG. 3 is a flow diagram of a method for archive stream based installation of one or more software files utilizing a call back hook in accordance with one embodiment of the invention.

Referring now to FIG. 3, FIG. 3 is a flow diagram of a method 300 for archive stream based installation of one or more software files utilizing a call back hook in accordance with one embodiment of the invention. FIG. 3 is discussed with reference to FIG. 4 which is a box diagram illustrating one example of use of a call back hook in the method of FIG. 3 in accordance with one embodiment of the invention.

Figure 4:
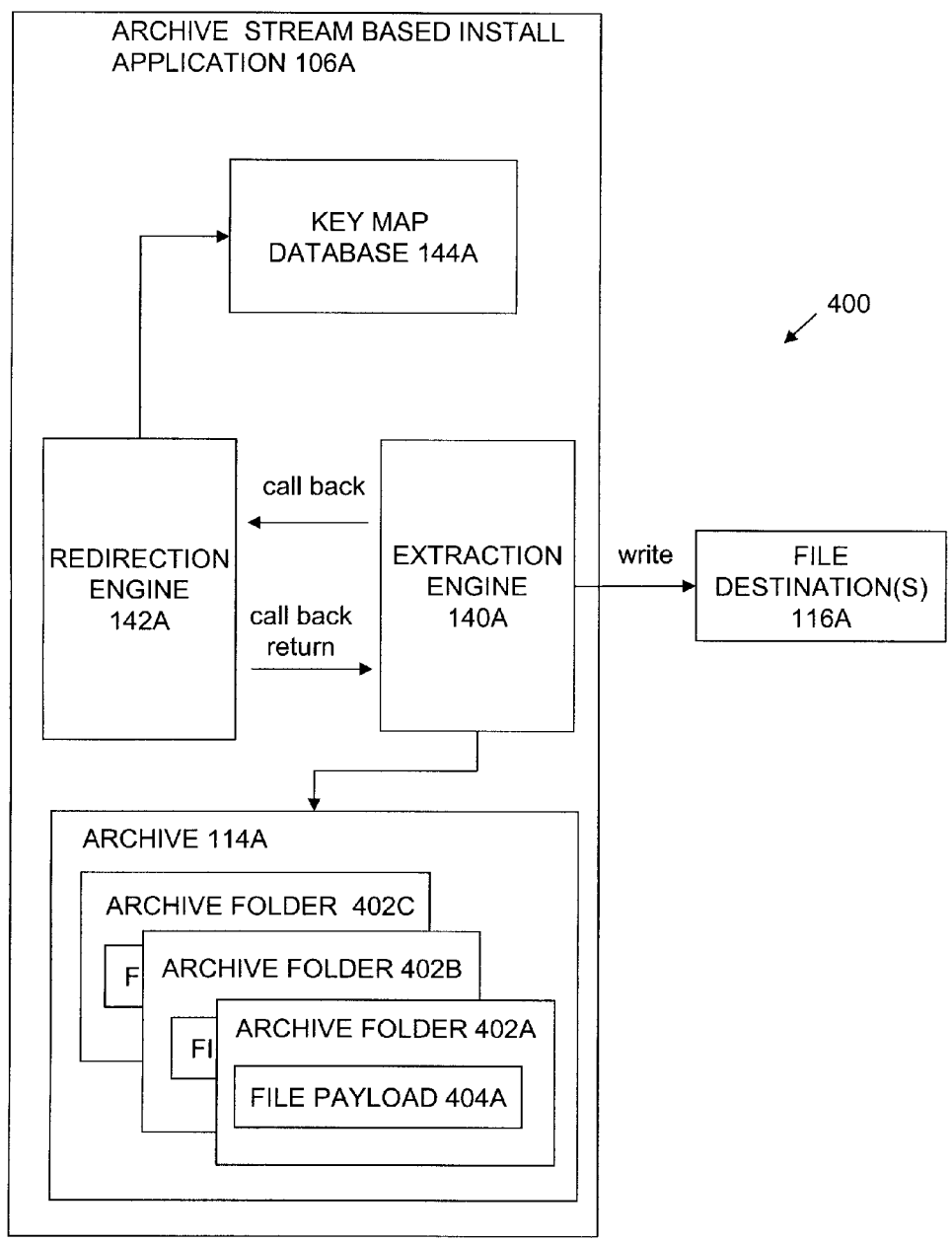
FIG. 4 is a box diagram illustrating one example of use of a call back hook in the method of FIG. 3 in accordance with one embodiment of the invention.

In FIG. 4, in one embodiment, archive stream based install application 106, shown in this embodiment as 106A, includes: redirection engine 142A; archive 114A; extraction engine 140A; and key map database 144A. In one embodiment, key map database 144A includes information that corresponds archive 114A folders and/or files to final file destinations, such as file destination(s) 116A. More particularly, in one embodiment, key map database 144A is a lookup table with name/value pairs.

Referring now to FIGS. 1, 2, 3 and 4 together, in one embodiment, execution of archive stream based install application 106 by processor 108 results in the operations of method 300 as described below. Herein references to files are also applicable to folders, as archives may include one or more folders, each folder having one or more file payloads, and/or sub-folders, and may include individual files. For example, as shown in FIG. 4, archive 114A includes archive folders 402A, 402B, and 402C, each having individual file payloads, respectively, 404A, 404B, and 404C. In one embodiment, the archive folders of archive 114A each include an embedded key, such a unique key, that correspond to unique key entries in key map database 144A. In one embodiment, method 300 is entered at an ENTER operation 302 and from ENTER operation 302 processing transitions to a REGISTER CALL BACK operation 304.

In REGISTER CALL BACK operation 304, redirection engine 142A registers a call back with the extraction engine 140A. Call backs and registering of call backs is well known to those of skill in the art and not further described herein in detail to avoid detracting from the principles of the invention. From REGISTER CALL BACK operation 304, processing transitions to a LAUNCH EXTRACTION PROCESS operation 306 .

In LAUNCH EXTRACTION PROCESS operation 306, an extraction process of extraction engine 140A is launched. In one embodiment, redirection engine 142A launches the extraction process of extraction engine 140A. Launching of an extraction engine is well known to those of skill in the art and not further described herein to avoid detracting from the principles of the invention. From LAUNCH EXTRACTION PROCESS operation 306, processing transitions to a FILE TO EXTRACT check operation 308.

In FILE TO EXTRACT check operation 308, a determination is made whether there is a file to extract from archive 114A. More particularly, extraction engine 140A of archive stream based install application 106A accesses archive 114A, and determines if there is a file to extract. Upon a determination, there is no file to extract from archive 114A ("NO"), from FILE TO EXTRACT check operation 308, processing transitions to an EXIT operation 324 with processing exiting method 300. Alternatively, upon a determination there is a file to extract ("YES"), from FILE TO EXTRACT check operation 308, processing transitions to a SEND CALL BACK operation 310.

In SEND CALLBACK operation 310, the extraction engine generates and sends a call back indicating an archive specified file destination for the file. More particularly, in one embodiment, extraction engine 140A generates and sends a call back to redirection engine 142A.

In one embodiment, the call back includes an archive specified path of the current archive file which indicates a destination for the file. For example, if extraction engine 140A determines that archive folder 402A is to be extracted, extraction engine 140A generates and sends a call back to redirection engine 142A including the archive specified file destination for archive folder 402A. In one embodiment, the archive specified path is a path specified in the archive, e.g., archive 114A. From SEND CALL BACK operation 310, processing transitions to a LOOK UP KEY MAP PATH operation 312.

In LOOK UP KEY MAP PATH operation 312, the call back is received by redirection engine 142A and a key map path for the archive file is looked up in key map database 144A. For example, in one embodiment, upon receipt of the call back, redirection engine 142A accesses key map database 144A and obtains a key map destination corresponding to the identifier, e.g., the unique key, of the archive file.

As earlier described, in one embodiment, key map database 144A is a lookup table with name/value pairs. The name of the archive file, such as unique key\folder\file.ext, is looked up in key map database 144A and the corresponding value is the key map specified path, i.e., the final destination path. From LOOK UP KEY MAP PATH operation 312, processing transitions to a REDIRECT check operation 314.

In REDIRECT check operation 314, a determination is made whether the archive file should be redirected from the archive specified path destination to the key map path destination. In one embodiment, redirection engine 142A compares the archive specified path in the call back to the key map path obtained from key map database 144A.

If the key map path corresponding to the archive file is different from the archive specified path, the file needs to be redirected to the final destination specified by the key map path. Alternatively, if the key map path corresponding to the archive file is not different from the archive specified path, the file does not need to be redirected, as the paths identify the same final destination.

Upon a determination that the file should not be redirected ("NO"), from REDIRECT check operation 314, processing transitions to a SEND CALL BACK RETURN operation 318, further described later herein. Alternatively, upon a determination that the file should be redirected ("YES"), from REDIRECT check operation 314, processing transitions to a MODIFY FILE DESTINATION operation 316.

In MODIFY FILE DESTINATION operation 316, the archive specified path is modified, e.g., replaced, with the key map path looked up in key map database 144A. More particularly, redirection engine 142A generates a call back return which includes the key map specified path, rather than the archive specified path. From MODIFY FILE DESTINATION operation 316, processing transitions to SEND CALL BACK RETURN operation 318.

In SEND CALL BACK RETURN operation 318, a return to the call back, herein termed the call back return, is sent from redirection engine 142A to extraction engine 140A. In one embodiment, where the archive specified path was not replaced, such as when a redirection was not needed, the call back return includes the archive specified path.

Alternatively, in one embodiment, where the archive specified path was replaced in operation 316, the call back return includes the key map path, rather than the archive specified path. In this way, extraction engine 140A is now provided the final file destination for the particular archive file. From SEND CALL BACK RETURN operation 318, processing transitions to an OPEN FILE DESTINATION operation 320.

In OPEN FILE DESTINATION operation 320, extraction engine 140A opens the file destination location specified in the call back return. More particularly, in one embodiment, the final destination for the file on host computer system 102 is opened. For example, in one embodiment, extraction engine 140A receives the call back return and opens the file destination specified in the call back return from redirection engine 142A.

Thus, in one embodiment, where the archive specified path was not replaced, the final file destination is the file location specified by the archive specified path. Alternatively, where the archive specified path was replaced in operation 316, the final file destination is the file location specified by the key map path. From OPEN FILE DESTINATION operation 320, processing transitions to a WRITE FILE operation 322.

In WRITE FILE operation 322, the archive file is written directly from archive 114A to the file destination opened in operation 320. More particularly, in one embodiment, extraction engine 140A directly writes the file, e.g., archive folder 402A, from archive 114A to the final file destination 116A specified in the call back return. In this way the folder is written directly from archive 114A to the final file destination, e.g., file destination 116A. From WRITE FILE operation 322, processing transitions and returns to FILE TO EXTRACT check operation 308 where a determination is made whether a file, e.g., a next file, is present to extract, as earlier described, with operations 308-322 being performed until there are no further files to extract from archive 114A. When there are no further files to extract ("NO"), processing transitions from FILE TO EXTRACT check operation 308 to EXIT operation 324 with processing exiting method 300.

The preceding embodiment utilized a call back hook to redirect files during an extraction process directly to final file destination(s) on a target computer system, such as host computer system 102. In another embodiment, a file system hook is used to redirect files during an extraction process directly to a final file destination, as further described herein with reference to FIGS. 5 and 6.

Figure 5:
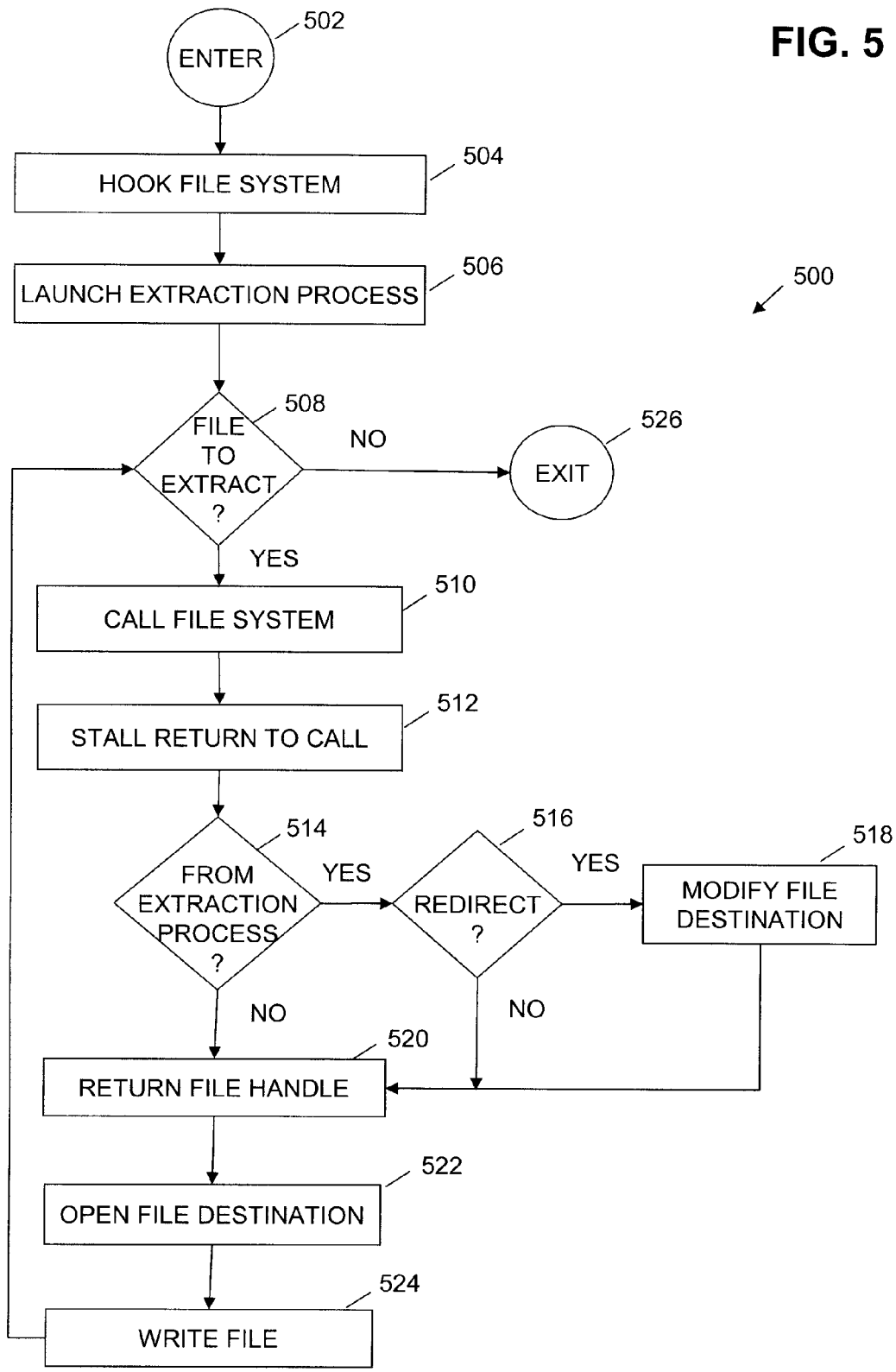
FIG. 5 is a flow diagram of a method for archive stream based installation of one or more software files utilizing a file system hook in accordance with one embodiment of the invention.

Referring now to FIG. 5, FIG. 5 is a flow diagram of a method 500 for archive stream based installation of one or more software files utilizing a file system hook in accordance with one embodiment of the invention. FIG. 5 is discussed with reference to FIG. 6 which is a box diagram illustrating one example of use of a file system hook in the method of FIG. 5 in accordance with one embodiment of the invention.

Figure 6:
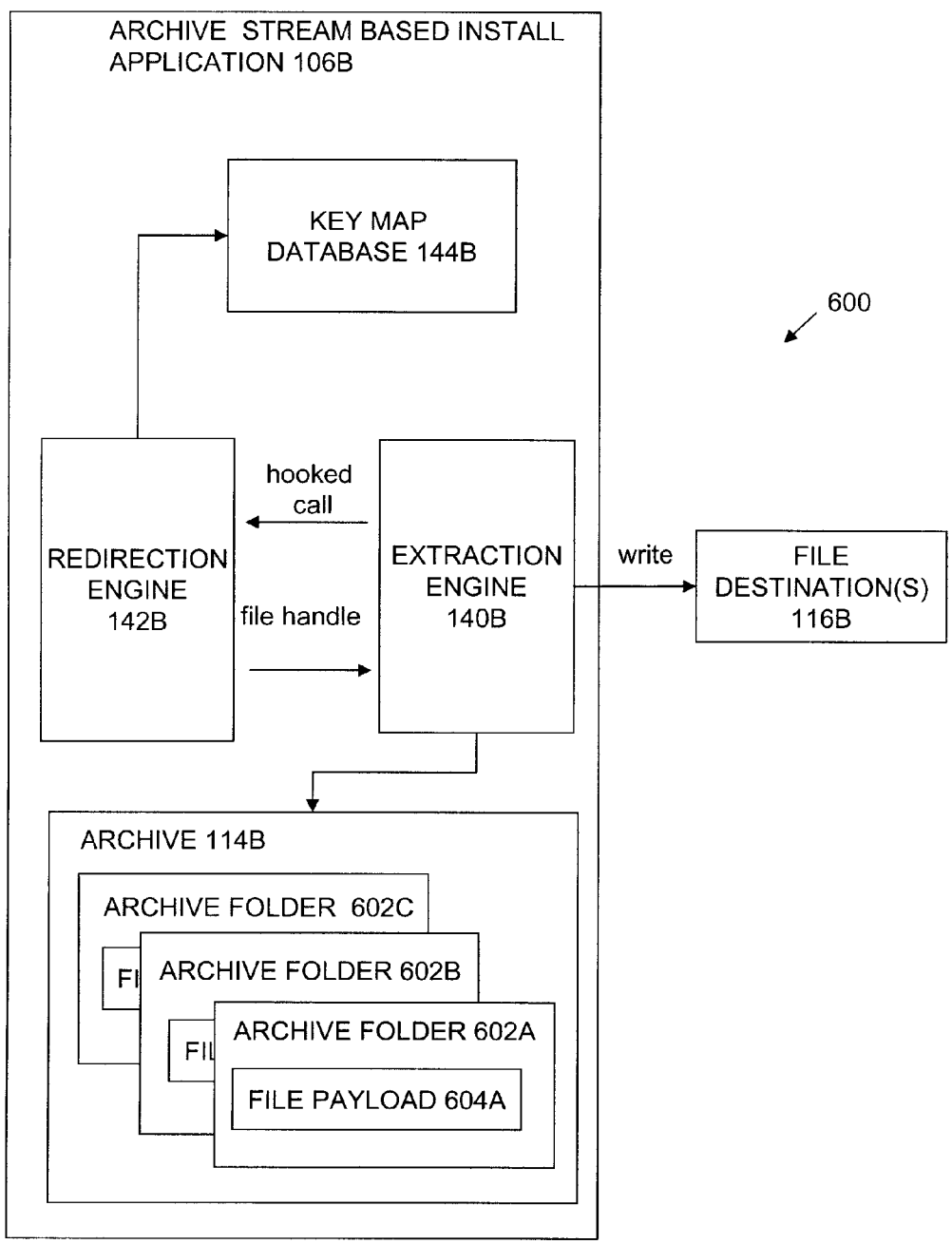
FIG. 6 is a box diagram illustrating one example of use of a file system hook in the method of FIG. 5 in accordance with one embodiment of the invention.

In FIG. 6, in one embodiment, archive stream based install application 106, shown in this embodiment as 106B, includes: redirection engine 142B; archive 114B; extraction engine 140B; and, key map database 144B. In one embodiment, key map database 144B includes information that corresponds archive 114B folders and/or files to final file destinations, such as file destination(s) 116B. More particularly, in one embodiment, key map database 144B is a lookup table with name/value pairs.

Referring now to FIGS. 1, 2, 5 and 6 together, in one embodiment, execution of archive stream based install application 106 by processor 108 results in the operations of method 500 as described below. Herein references to files are also applicable to folders, as archives may include one or more folders, each folder having one or more file payloads, and/or sub-folders, and may include individual files.

For example, as shown in FIG. 6, archive 114B includes archive folders 602A, 602B, and 602C, each having individual file payloads, respectively, 604A, 604B, and 604C. In one embodiment, the archive folders of archive 114B each include an embedded key, such a unique key, that correspond to unique key entries in key map database 144B. In one embodiment, method 500 is entered at an ENTER operation 502, and from ENTER operation 502, processing transitions to a HOOK FILE SYSTEM operation 504.

In HOOK FILE SYSTEM operation 504, a file system hook in installed on host computer system 102. More particularly, in one embodiment redirection engine 142B installs a file system hook on host computer system 102. In one embodiment, the file system hook intercepts selected file system event(s), such as returns to calls from the file system (not shown) of host computer system 102 prior to receipt by the calling module, such as extraction engine 140B.

The file system hook can be implemented using any one of variety of file system hooking techniques, such as by hooking a call table (not shown) to the file system. File system hooking techniques are well known to those of skill in the art and not further described herein to avoid detracting from the principles of the invention. From HOOK FILE SYSTEM operation 504, processing transitions to a LAUNCH EXTRACTION PROCESS operation 506.

In LAUNCH EXTRACTION PROCESS operation 506, an extraction process of extraction engine 140B is launched. In one embodiment, redirection engine 142B launches the extraction process of extraction engine 140B. Launching of an extraction engine is well known to those of skill in the art and not further described herein to avoid detracting from the principles of the invention. From LAUNCH EXTRACTION PROCESS operation 506, processing transitions to a FILE TO EXTRACT check operation 508.

In FILE TO EXTRACT check operation 508, a determination is made whether there is a file to extract from archive 114B. More particularly, extraction engine 140B of archive stream based install application 106B accesses archive 114B, and determines if there is a file to extract. Upon a determination, there is no file to extract from archive 114B ("NO"), from FILE TO EXTRACT check operation 508, processing transitions to an EXIT operation 526 with processing exiting method 500. Alternatively, upon a determination there is a file to extract ("YES"), from FILE TO EXTRACT check operation 508, processing transitions to a to a CALL FILE SYSTEM operation 510.

In CALL FILE SYSTEM operation 510, the file system (not shown) of host computer system 102 is called to open the archive specified file destination of the file to extract. More particularly, in one embodiment, extraction engine 140B generates and sends a call to the file system to open the file location identified by the archive specified path for the file to be extracted. From CALL FILE SYSTEM operation 510, processing transitions to a STALL RETURN TO CALL operation 512.

In STALL RETURN TO CALL operation 512, the call to the file system is stalled. In particular, in one embodiment, the return from the call to the file system is intercepted by the hook on the file system and redirected to redirection engine 142B where the return is received and stalled for further processing. In one embodiment, the return to the call includes a file handle with the file location of file requested in the call. From STALL RETURN TO CALL operation 512, processing transitions to a FROM EXTRACTION PROCESS check operation 514.

In FROM EXTRACTION PROCESS check operation 514, a determination is made whether the stalled return is in response to a call from the extraction engine. As the return could be in response to a call generated by processes other than extraction engine 140B, a check is made to determine whether the return is associated with extraction engine 140B.

For example, in one embodiment, the call source parameter of the return can be checked to see if the path of extraction engine 140B is identified. If the path of extraction engine 140B is identified, the call is from the extraction process; otherwise, the call is not from the extraction process. In other embodiments, other techniques can be used to determine if the return is from the extraction process.

Upon a determination the file is not from the extraction process ("NO"), from FROM EXTRACTION PROCESS check operation 514, processing transitions to a RETURN FILE HANDLE operation 520 further described later herein. Alternatively, upon a determination that the stalled return is from the extraction process ("YES"), processing transitions from FROM EXTRACTION PROCESS check operation 514 to a REDIRECT check operation 516.

In REDIRECT check operation 516, a determination is made whether the file should be redirected from the archive specified path destination identified in the file handle to a key map path destination. For example, in one embodiment, upon receipt of the call back, redirection engine 142B accesses key map database 144B and obtains a key map destination corresponding to the identifier, e.g., the unique key, of the archive file.

As earlier described, in one embodiment, key map database 144B is a lookup table with name/value pairs. The name of the archive file, such as unique key\folder\file.ext, is looked up in key map database 144B and the corresponding value is the key map specified path, i.e., the final destination path. In one embodiment, redirection engine 142B compares the archive specified path in the returned file handle to the key map path obtained from key map database 144B.

If the key map path corresponding to the archive file is different from the archive specified path in the file handle, the file needs to be redirected to the final destination specified by the key map path. Alternatively, if the key map path corresponding to the archive file is not different from the archive specified path, the file does not need to be redirected, as the paths identify the same final file destination.

Upon a determination that the file should not be redirected ("NO"), from REDIRECT check operation 516, processing transitions to a RETURN FILE HANDLE operation 520 further described later herein. Alternatively, upon a determination that the file should be redirected ("YES"), from REDIRECT check operation 516, processing transitions to a MODIFY FILE DESTINATION operation 518.

In MODIFY FILE DESTINATION operation 518, the file destination specified in the stalled file handle is modified, e.g., replaced, with the key map path destination. From MODIFY FILE DESTINATION operation 518, processing transitions to RETURN FILE HANDLE operation 520.

In RETURN FILE HANDLE operation 520, the file handle modified in operation 518 is returned to the caller. Thus, in one embodiment, when the caller is extraction engine 140B, the file handle is returned to extraction engine 140B. In instances in which the caller was not from the extraction process, the file handle is returned unmodified to the caller. From RETURN FILE HANDLE operation 520, processing transitions to OPEN FILE DESTINATION operation 522.

In OPEN FILE DESTINATION operation 522, extraction engine 140B opens the file destination location specified in the returned file handle. More particularly, in one embodiment, the final destination for the file on host computer system 102 is opened.

For example, in one embodiment, extraction engine 140B receives the returned file handle and opens the file destination specified in the file handle from redirection engine 142B. In one embodiment, where the file handle was modified to the key map destination, the key map path destination specified in the key map database, is opened in the file system by extraction engine 140B. From OPEN FILE DESTINATION operation 522, processing transitions to a WRITE FILE operation 524.

In WRITE FILE operation 524, the archive file is written directly from archive 114B to the file destination opened in operation 522. More particularly, in one embodiment, extraction engine 140B directly writes the file, e.g., archive folder 602A, from archive 114B to the final file destination 116B specified in returned file handle. In this way the folder is written directly from archive 114B to the final file destination, e.g., file destination 116B. From WRITE FILE operation 524, processing transitions and returns to FILE TO EXTRACT check operation 508 where a determination is made whether a file, e.g., a next file, is present to extract, as earlier described, with operations 508-524 being performed until there are no further files to extract from archive 114B. When there are no further files to extract ("NO"), processing transitions from FILE TO EXTRACT check operation 508 to EXIT operation 526 with processing exiting method 500.

In the above embodiments, the extraction process of an extraction engine was hooked using a call back hook (method 300) and a file system hook (method 500). In a further embodiment, a new archive extraction engine is described which is configured to implement an archive stream based installation method as further described herein with reference to FIGS. 7 and 8.

Figure 7:
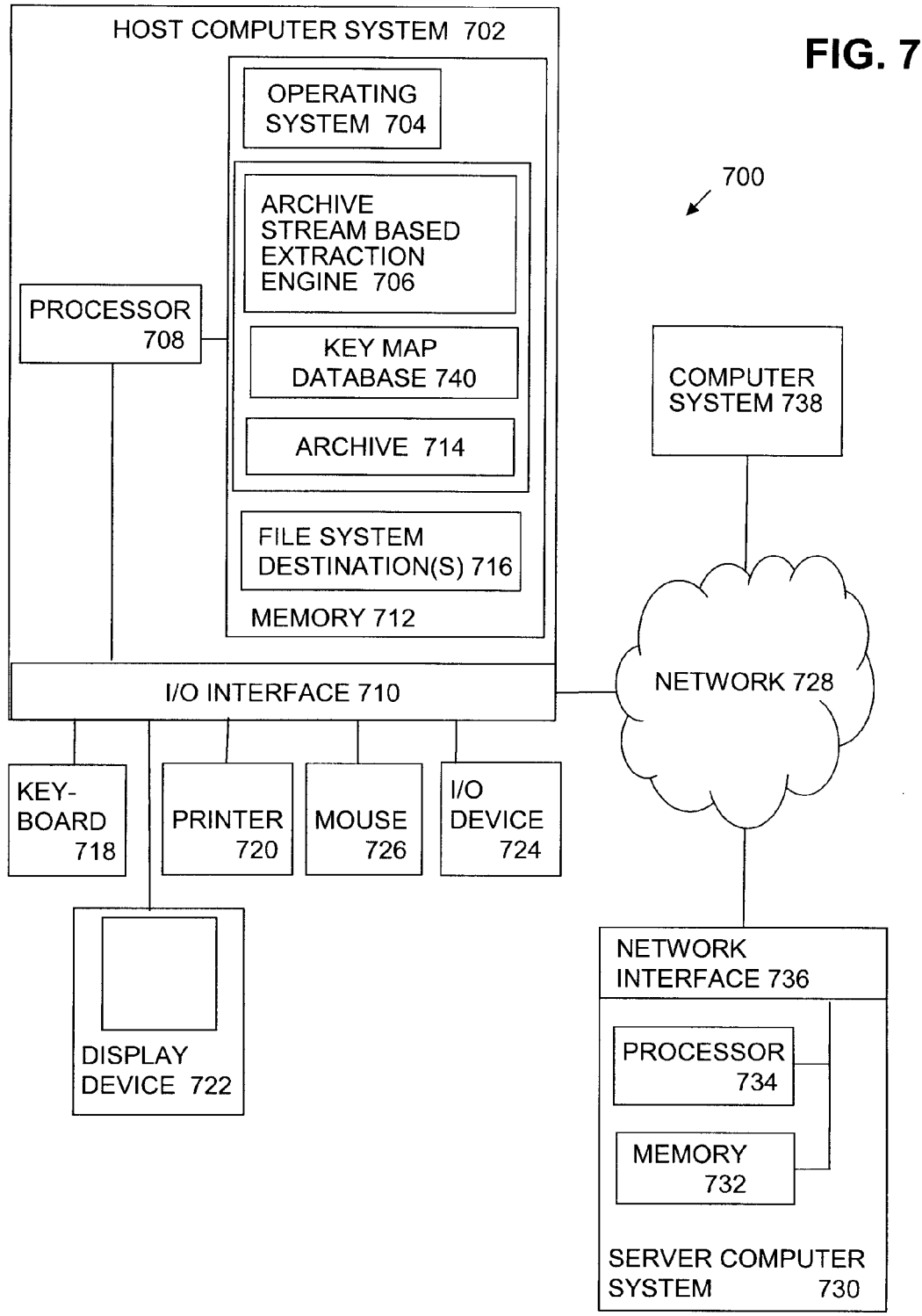
FIG. 7 is a diagram of a computer system including an archive stream based installation extraction engine executing on a host computer system in accordance with one embodiment of the invention.

Referring now to FIG. 7, FIG. 7 is a diagram of a computer system 700 including an archive stream based installation extraction engine 706 executing on a host computer system 702 in accordance with one embodiment of the invention. In one embodiment, archive stream based installation extraction engine 706 includes an archive 714 and a key map database 740.

In one embodiment, archive 714 includes one or more files and/or file folders to be installed on a target computer system, such as host computer system 702. In one embodiment, archive 714 is a keyed archive in which each of the folders to be extracted is identified by a key identifier. In one embodiment, key map database 740 is a database of information including final destination information corresponding to files in archive 714. In one embodiment, key map database 740 includes entries which include key identifiers and corresponding final destination paths, e.g., final destination locations. In one embodiment, archive stream based extraction engine 706 is loaded onto host computer system 702, such as via I/O device 724.

Figure 8:
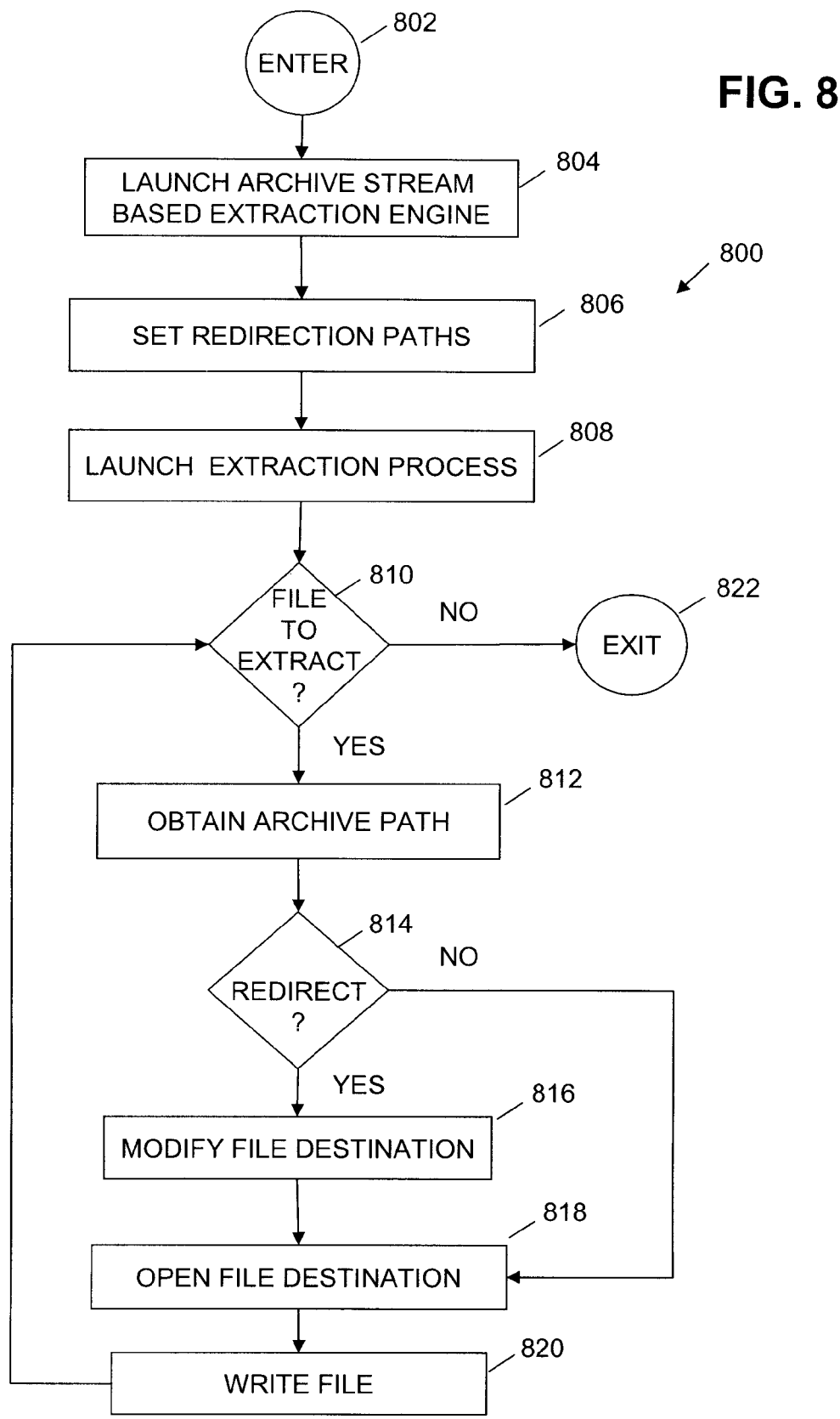
FIG. 8 illustrates a flow diagram of a method for archive stream based installation of one or more software files implemented by the archive stream based installation extraction engine of FIG. 7 in accordance with one embodiment of the invention.

FIG. 8 illustrates a flow diagram of a method 800 for archive stream based installation of one or more software files implemented by the archive stream based installation extraction engine 706 of FIG. 7 in accordance with one embodiment of the invention. Referring now to FIGS. 7 and 8 together, in one embodiment, execution of method 800 of archive stream based extraction engine 706 by processor 108 results in the operations of method 800 as described below. In one embodiment, method 800 is entered at an ENTER operation 802, and from ENTER operation 802, processing transitions to a LAUNCH ARCHIVE STREAM BASED EXTRACTION ENGINE operation 804.

In LAUNCH ARCHIVE STREAM BASED EXTRACTION ENGINE operation 804, archive extraction engine 706 is launched on host computer system 702. From LAUNCH STREAM BASED ARCHIVE EXTRACTION ENGINE operation 804, processing transitions to a SET REDIRECTION PATH(S) operation 806.

In SET REDIRECTION PATH(S) operation 806, archive stream based extraction engine 706 accesses key map database 740, looks up the corresponding redirection path for each archive file to be installed, and sets the corresponding redirection path for each of the archive files.

Thus, rather than hooking the extraction engine process through a call back hook or a file system hook, as earlier described with reference to methods 300 and 500, and looking up the redirection paths for the extraction engine, archive stream based extraction engine 706 itself accesses key map database 740, looks up the redirection paths, and sets the redirection paths for each of the archive files. From SET REDIRECTION PATH(S) operation 806, processing transitions to a LAUNCH EXTRACTION PROCESS operation 808.

In LAUNCH EXTRACTION PROCESS 808, archive stream based extraction engine 706 launches an extraction process. From LAUNCH EXTRACTION PROCESS operation 808, processing transitions to a FILE TO EXTRACT check operation 810.

In FILE TO EXTRACT check operation 810, a determination is made whether there is a file to extract from archive 714. More particularly, archive stream based extraction engine 706 accesses archive 714 and determines if there is a file to extract. Upon a determination, there is no file to extract from archive 714 ("NO"), from FILE TO EXTRACT check operation 810, processing transitions to an EXIT operation 822, with processing exiting method 800. Alternatively, upon a determination there is a file to extract ("YES"), from FILE TO EXTRACT check operation 810, processing transitions to an OBTAIN ARCHIVE PATH operation 812.

In OBTAIN ARCHIVE PATH operation 812, archive stream based extraction engine 706 accesses the archive specified path for the file to be extracted from archive 714, such as Unique key\Folder\File.ext. From OBTAIN ARCHIVE PATH operation 812, processing transitions to a REDIRECT check operation 814.

In REDIRECT check operation 814, archive stream based extraction engine 706 compares the archive specified path to the key map path obtained from key map database 740. If the key map path corresponding to the archive file is different from the archive specified path, the file needs to be redirected to the final destination specified by the key map path.

Alternatively, if the key map path corresponding to the archive file is not different from the archive specified path, the file does not need to be redirected, as the paths identify the same final file destination. Upon a determination that the file should not be redirected ("NO"), from REDIRECT check operation 814, processing transitions to an OPEN FILE DESTINATION operation 818 further described later herein. Alternatively, upon a determination that the file should be redirected ("YES"), from REDIRECT check operation 814, processing transitions to a MODIFY FILE DESTINATION operation 816.

In MODIFY FILE DESTINATION operation 816, the archive specified path is modified, e.g., replaced, with the key map path, i.e., the redirection path. From MODIFY FILE DESTINATION operation 816, processing transitions to OPEN FILE DESTINATION operation 818.

In OPEN FILE DESTINATION operation 818, the final file destination location is opened. More particularly, in one embodiment, the final file destination for the archive file is opened on host computer system 702. For example, in one embodiment, archive extraction engine 706 opens the file destination.

Thus, in one embodiment, where the archive specified path was not replaced, the final file destination is the file location specified by the archive specified path. Alternatively, where the archive specified path was replaced in operation 816, the final file destination is the file location specified by the redirection path. From OPEN FILE DESTINATION operation 818, processing transitions to a WRITE FILE operation 820.

In WRITE FILE operation 820, the archive file is written directly from archive 714 to the final file destination opened in operation 818. More particularly, in one embodiment, archive stream based extraction engine 706 directly writes the file from archive 714 to a final file destination 716 opened in operation 818. From WRITE FILE operation 820, processing transitions and returns to FILE TO EXTRACT check operation 810 where a determination is made whether a file, e.g., a next file, in archive 714 is present to extract, as earlier described, with operations 810-820 being performed until there are no further files to extract from archive 714. When there are no further files to extract ("NO"), processing transitions from FILE TO EXTRACT check operation 810 to EXIT operation 822 with processing exiting method 800.

Referring now again to FIG. 1, in one embodiment of the invention, archive stream based install application 106 is in memory 112. As used herein, a computer memory refers to a volatile memory, a non-volatile memory, or a combination of the two.

Although archive stream based install application 106 is referred to as an application, this is illustrative only. Archive stream based install application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments in accordance with the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM disks, DVDs, ROM cards, floppy disks, magnetic tapes, computer hard drives, servers on a network and signals transmitted over a network representing computer readable code. In another embodiment, a computer program product comprises a tangible storage medium configured to store computer readable code including CD-ROM disks, DVDs, ROM cards, floppy disks, magnetic tapes, computer hard drives, and servers on a network.

As illustrated in FIG. 1, this medium may belong to the computer system itself. However, the medium also may be removed from the computer system. For example, archive stream based install application 106 may be stored in memory 132 that is physically located in a location different from processor 108. Processor 108 should be coupled to the memory 132. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionality of archive stream based install application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of archive stream based install application 106 in accordance with one embodiment of present invention can be implemented in a wide variety of computer system configurations. In addition, the functionality of archive stream based install application 106 could be stored as different modules in memories of different devices.

For example, archive stream based install application 106 could initially be stored in server computer system 130, and then as necessary, a portion of archive stream based install application 106 could be transferred to host computer system 102 and executed on host computer system 102. Consequently, part of the functionality of archive stream based install application 106 would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, archive stream based install application 106 is stored in memory 132 of server computer system 130. Archive stream based install application 106 is transferred over network 128 to memory 112 in host computer system 102. In this embodiment, network interface 136 and I/O interface 110 would include analog modems, digital modems, or a network interface card. If modems are used, network 128 includes a communications network, and archive stream based install application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
    launching an extraction process; and
    extracting at least one file from an archive directly to one or more final file destinations on a computer system,
        wherein said extracting at least one file from an archive directly to one or more final file destinations on a computer system comprises:
            registering a call back with an extraction engine;
            launching said extraction engine, said launching causing said extraction engine to obtain an archive specified file destination for said at least one file from said archive, and to generate and send a call back;
            receiving said call back from said extraction engine, said call back including an archive specified file destination for said at least one file;
            looking up a key map specified file destination associated with said at least one file in a key map database;
            determining whether said at least one file is to be redirected from said archive specified file destination to said key map specified file destination based upon whether said archive specified file destination matches said key map specified file destination;
            wherein upon a determination that said at least one file is to be redirected,
                generating a modified call back return, said modified call back return including said key map specified file destination; and
                sending said modified call back return to said extraction engine,
                    wherein in response to receiving said modified call back return said extraction engine opens a location on a computer system at said key map specified file destination, and
                    writes said at least one file from said archive directly to said location at said key map specified file destination.

2. The computer implemented method of claim 1 wherein upon a determination that said at least one file is not to be redirected, generating a call back return, said call back return including said archive specified file destination; and
    sending said call back return to said extraction engine,
        wherein in response to receiving said call back return said extraction engine opens a location on said computer system at said archive specified file destination, and
    directly writes said at least one file from said archive to said location at said archive specified file destination.

3. The computer implemented method of claim 1 further comprising:
    determining whether there is said at least one file to be extracted from said archive by said extraction engine; and
    wherein upon a determination that there is said at least one file to be extracted, said extraction engine generating said call back, and
    sending said call back.

4. The computer implemented method of claim 3 wherein upon a determination that there is not said at least one file to be extracted, exiting said computer implemented method.

5. The computer implemented method of claim 1 wherein said at least one file is located in a folder of said archive having a unique key identifier, and further wherein said key map database includes one or more entries, each of said one or more entries associating an archive specified file destination with a key map specified file destination based on at least a unique key identifier.

6. A computer implemented method comprising:
    launching an extraction process; and
    extracting at least one file from an archive directly to one or more final file destinations on a computer system,
        wherein said extracting said at least one file from an archive directly to one or more final file destinations on a target computer system comprises:
            installing a file system hook on a computer system, said file system hook for intercepting and stalling one or more file system events on said computer system;
            launching an extraction engine, said launching initiating extraction of said at least one file from an archive by said extraction engine, said extraction engine generating a call to a file system to open a location at an archive specified file destination associated with said file;
            receiving a file system event intercepted by said file system hook, said file system event including a file handle identifying said archive specified file destination;
            stalling said file system event;
            determining whether said file system event is associated with said extraction engine;
            wherein upon a determination that said file system event is associated with said extraction engine,
                determining whether said at least one file is to be redirected from said archive specified file destination to a key map specified file destination;
                wherein upon a determination that said at least one file is to be redirected,
                    generating a modified file handle, said modified file handle including said key map specified file destination; and
                    returning said modified file handle to said extraction engine,
                        wherein in response to receiving said modified file handle said extraction engine opens a location on said computer system at said key map specified file destination, and
                        writes said at least one file from said archive directly to said location at said key map specified file destination.

7. The computer implemented method of claim 6 wherein upon a determination that said at least one file is not to be redirected, returning said file handle including said archive specified file destination to said extraction engine, wherein in response to receiving said file handle said extraction engine opens a location at said archive specified file destination, and
    writes said at least one file from said archive directly to said location at said archive specified file destination.

8. The computer implemented method of claim 6 wherein said determining whether said at least one file is to be redirected from said archive specified file destination to a key map specified file destination comprises:
    looking up a key map specified file destination associated with said at least one file in a key map database; and
    determining whether said at least one file is to be redirected from said archive specified file destination to said key map specified file destination based upon whether said archive specified file destination matches said key map specified file destination.

9. The computer implemented method of claim 6 wherein said at least one file is located in a folder of said archive having a unique key identifier, and further wherein said key map database includes one or more entries, each of said one or more entries associating an archive specified file destination with a key map specified file destination based on at least a unique key identifier.

10. A computer program product comprising a tangible computer-readable storage medium storing computer program code for a method comprising:
   launching an extraction process; and
   extracting at least one file from an archive directly to one or more final file destinations on a computer system,
      wherein in said method, said extracting said at least one file from an archive directly to one or more final file destinations on a computer system comprises:
      registering a call back with an extraction engine;
      launching said extraction engine, said launching causing said extraction engine to obtain an archive specified file destination for said at least one file from said archive, and to generate and send a call back;
      receiving said call back from said extraction engine, said call back including an archive specified file destination for said at least one file;
      looking up a key map specified file destination associated with said at least one file in a key map database;
      determining whether said at least one file is to be redirected from said archive specified file destination to said key map specified file destination based upon whether said archive specified file destination matches said key map specified file destination;
      wherein upon a determination that said at least one file is to be redirected,
         generating a modified call back return, said modified call back return including said key map specified file destination; and
         sending said modified call back return to said extraction engine,
            wherein in response to receiving said modified call back return said extraction engine opens a location on a computer system at said key map specified file destination, and
            writes said at least one file from said archive directly to said location at said key map specified file destination.

11. The computer program product of claim 10 wherein said at least one file is located in a folder of said archive having a unique key identifier, and further wherein said key map database includes one or more entries, each of said one or more entries associating an archive specified file destination with a key map specified file destination based on at least a unique key identifier.

12. A computer program product comprising a tangible computer-readable storage medium storing computer program code for a method comprising:
   launching an extraction process; and
   extracting at least one file from an archive directly to one or more final file destinations on a computer system,
      wherein in said method, said extracting said at least one file from an archive directly to one or more final file destinations on a computer system comprises:
      installing a file system hook on a computer system, said file system hook for intercepting and stalling one or more file system events on said computer system;
      launching an extraction engine, said launching initiating extraction of said at least one file from an archive by said extraction engine, said extraction engine generating a call to a file system to open a location at an archive specified file destination associated with said at least one file;
      receiving a file system event intercepted by said file system hook, said file system event including a file handle identifying said archive specified file destination;
      stalling said file system event;
      determining whether said file system event is associated with said extraction engine;
      wherein upon a determination that said file system event is associated with said extraction engine, determining whether said at least one file is to be redirected from said archive specified file destination to a key map specified file destination;
      wherein upon a determination that said at least one file is to be redirected,
         generating a modified file handle, said modified file handle including said key map specified file destination; and
         returning said modified file handle to said extraction engine,
            wherein in response to receiving said modified file handle said extraction engine opens a location on said computer system at said key map specified file destination, and
            writes said at least one file from said archive directly to said location at said key map specified file destination.

13. The computer program product of claim 12 wherein said at least one file is located in a folder of said archive having a unique key identifier, and further wherein said key map database includes one or more entries, each of said one or more entries associating an archive specified file destination with a key map specified file destination based on at least a unique key identifier.

14. An archive stream based extraction engine comprising:
   means for extracting at least one file from an archive directly to one or more final file destinations on a computer system,
      wherein said means for extracting said at least one file from an archive directly to one or more final file destinations on a computer system comprises:
      means for installing a file system hook on a computer system, said file system hook for intercepting and stalling one or more file system events on said computer system;
      means for launching an extraction engine, said launching initiating extraction of said at least one file from an archive by said extraction engine, said extraction engine generating a call to a file system to open a location at an archive specified file destination associated with said at least one file;
      means for receiving a file system event intercepted by said file system hook, said file system event including a file handle identifying said archive specified file destination;
      means for stalling said file system event;
      means for determining whether said file system event is associated with said extraction engine;
         wherein upon a determination that said file system event is associated with said extraction engine, means for determining whether said at least one file is to be redirected from said archive specified file destination to a key map specified file destination;
         wherein upon a determination that said at least one file is to be redirected, means for generating a modified file handle, said modified file handle including:

said key map specified file destination; and means for returning said modified file handle to said extraction engine, wherein in response to receiving said modified file handle said extraction engine opens a location on said computer system at said key map specified file destination; and writes said at least one file from said archive directly to said location at said key map specified file destination in the computer system.

* * * * *